US008237692B2

(12) United States Patent
Tsai

(10) Patent No.: US 8,237,692 B2
(45) Date of Patent: Aug. 7, 2012

(54) FLAT PANEL DISPLAY AND DRIVING METHOD WITH DC LEVEL VOLTAGE GENERATED BY SHIFT REGISTER CIRCUIT

(75) Inventor: Yi-Cheng Tsai, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 1061 days.

(21) Appl. No.: 12/171,965

(22) Filed: Jul. 11, 2008

(65) Prior Publication Data

US 2009/0167741 A1 Jul. 2, 2009

(30) Foreign Application Priority Data

Dec. 27, 2007 (TW) ............................... 96150628 A

(51) Int. Cl.
*G06F 3/038* (2006.01)

(52) U.S. Cl. ........................... 345/204; 345/100; 377/64

(58) Field of Classification Search .......... 345/204-206, 345/208, 211-214, 92-94, 98-100, 82, 84; 377/64-81
See application file for complete search history.

(56) References Cited

U.S. PATENT DOCUMENTS

| | | | | |
|---|---|---|---|---|
| 7,664,218 | B2 * | 2/2010 | Tobita | 377/64 |
| 2002/0149318 | A1 * | 10/2002 | Jeon et al. | 315/169.1 |
| 2006/0007085 | A1 * | 1/2006 | Kim et al. | 345/87 |
| 2008/0056430 | A1 * | 3/2008 | Chang et al. | 377/64 |

* cited by examiner

*Primary Examiner* — Liliana Cerullo
(74) *Attorney, Agent, or Firm* — Lowe Hauptman Ham & Berner LLP

(57) ABSTRACT

A flat panel display including a glass substrate, a source driving unit and a gate driving unit is provided. An $n^{th}$ shift register of the gate driving unit includes a pull-up unit, a driving unit, a pull-down unit and a driving control unit. When the driving unit turns on the pull-up unit according to a trigger signal and the pull-up unit enables an output terminal to output an $n^{th}$ output signal according to a first clock signal, the driving control unit turns off the pull-down unit. The trigger signal is an $(n-1)^{th}$ output signal or a start signal. Afterwards, the driving control unit provides a DC level voltage according to a second clock signal to drive the pull-down unit, and the pull-down unit enables the output terminal to output a low level voltage. The DC level voltage is between a high level voltage of the $n^{th}$ output signal and the low level voltage.

22 Claims, 9 Drawing Sheets

23n

100

FLAT PANEL DISPLAY AND DRIVING METHOD WITH DC LEVEL VOLTAGE GENERATED BY SHIFT REGISTER CIRCUIT

This application claims the benefit of Taiwan application Serial No. 96150628, filed Dec. 27, 2007, the entire subject matter of which is incorporated herein by reference.

BACKGROUND

1. Field

The disclosure relates, in general, to a flat panel display and a driving method thereof, and in particular, to a flat panel display configurable with a reduced bezel width and a driving method thereof.

2. Related Art

Referring to FIG. 1, a circuit diagram of a shift register 100 of a gate driving unit of a conventional flat panel display is shown. The shift register 100 includes transistors T10 through T70, outputs an output signal Out'_n at an output terminal OUT thereof, and receives clock signals C1', C3' as well as an output signal Out'_n+2 from another shift register. In the shift register 100, when the drain terminals of the first transistor T10 and the third transistor T30 receive a very high revel bias voltage, such as 16V, the node P10 will be biased at the very high level bias voltage.

However, the high level bias voltage at the node P10 will excessively bias the gates of the second transistor T20 and the sixth transistor T60. As a result, the respective threshold voltages of the second transistor T20 and the sixth transistor T60 will increase to a considerable level with time. As the threshold voltage increases, the second transistor T20 is weakened in discharging electricity to the node P20, and more time is required to turn off the fifth transistor T50. Consequently, the scan line which the output terminal OUT belongs to will receive erroneous data, and the gate driving unit will cause erroneous action.

To solve the above problem, an additional DC power source is provided to the drain terminal of the third transistor T30 to provide an additional work voltage Vdd' smaller than the original high level bias voltage, so as to reduce the gate bias voltages of the second transistor T20 and the sixth transistor T60. However, an additional circuit is required to provide the DC power source, thereby increasing the overall cost. Moreover, a wide power line should be attached to the edge of the glass substrate for power transmission from the additional DC power source. Such wide power line will increase the bezel width of the glass substrate.

SUMMARY

According to a first aspect of the present invention, a flat panel display including a glass substrate, a source driving unit and a gate driving unit is provided. The glass substrate has many pixels. The source driving unit is electrically connected to these pixels. The gate driving unit includes N shift registers, wherein N is a positive integer. The $n^{th}$ shift register includes a pull-up unit, a driving unit, a pull-down unit and a driving control unit, wherein n is a positive integer from 1 to N. The pull-up unit is coupled to an output terminal for outputting at the output terminal, when the pull-up unit is turned on, a first portion of an nth output signal according to one of a first clock signal and a second clock signal. The driving unit drives the pull-up unit according to a trigger signal. The pull-down unit is coupled to the output terminal for outputting at the output terminal, when the pull-down unit is turned on, a second, subsequent portion of the nth output signal. The driving control unit provides a DC level voltage and drives the pull-down unit according to the other clock signal. The trigger signal is an $(n-1)^{th}$ output signal for n+1, and a start signal for n=1. The DC level voltage is between a high level voltage of the first portion and a low level voltage of the second portion of the $n^{th}$ output signal.

According to a second aspect of the present invention, a method for driving a flat panel display is provided. The flat panel display includes a glass substrate, a source driving unit and a gate driving unit. The glass substrate has many pixels, and the source driving unit is electrically connected to these pixels. The gate driving unit includes N shift registers, wherein N is a positive integer. The $n^{th}$ shift register includes a pull-up unit, a driving unit, a pull-down unit and a driving control unit, wherein n is a positive integer from 1 to N. The pull-up unit is coupled to an output terminal. The driving unit drives the pull-up unit. The pull-down unit is coupled to the output terminal. The driving control unit provides a DC level voltage and drives the pull-down unit. The method for driving the flat panel display includes the following steps. First, when the driving unit turns on the pull-up unit according to a trigger signal and the pull-up unit enables the output terminal to output an $n^{th}$ output signal according to one of a first clock signal and a second clock signal, the driving control unit turns off the pull-down unit, wherein the trigger signal is an $(n-1)^{th}$ output signal for $n \neq 1$, and a start signal for n=1. Afterwards, the driving control unit provides a DC level voltage according to the other clock signal to drive the pull-down unit, and the pull-down unit enables the output terminal to output a low level voltage. The DC level voltage is between a high level voltage of the $n^{th}$ output signal and the low level voltage.

BRIEF DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION OF EMBODIMENTS

Figure 1:
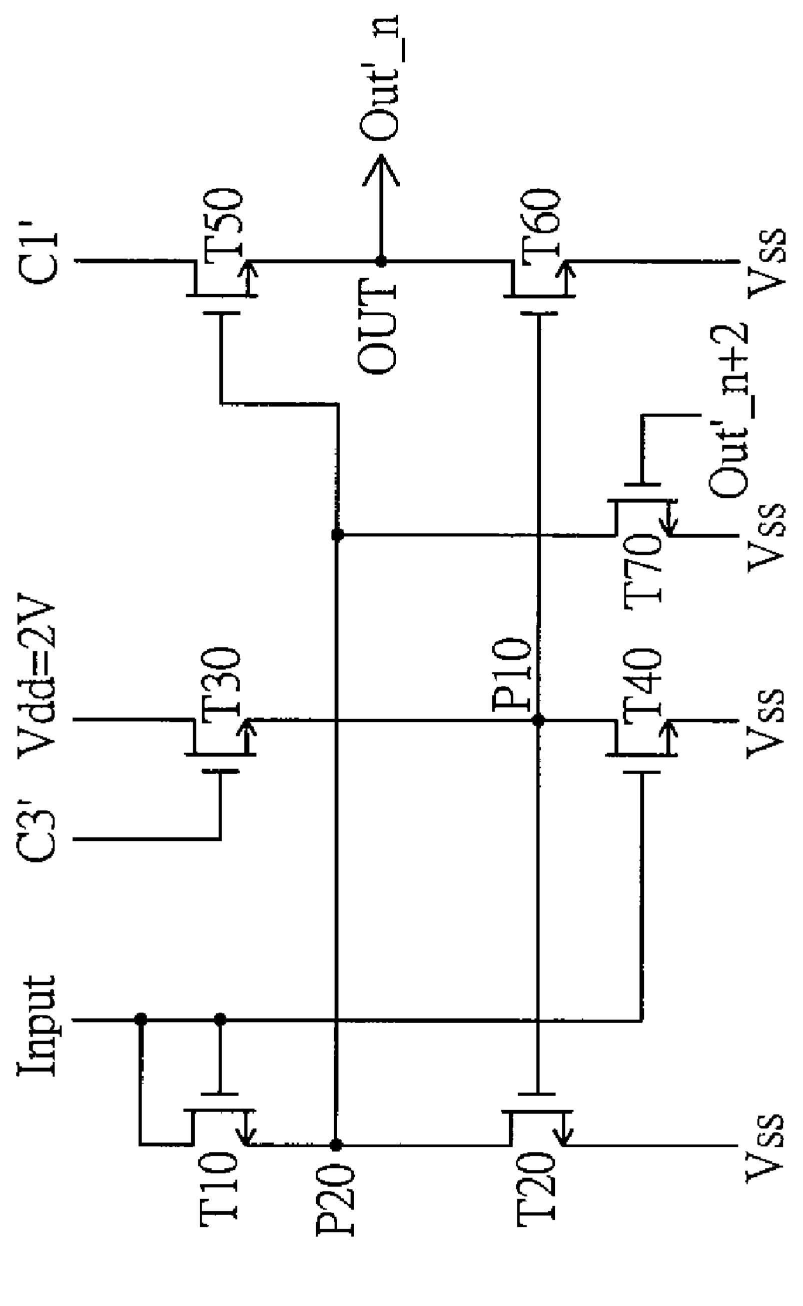
FIG. 1(PRIOR ART)
FIG. 1 (Prior Art) shows a circuit diagram of a shift register of a gate driving unit of a conventional flat panel display.
Figure 2:
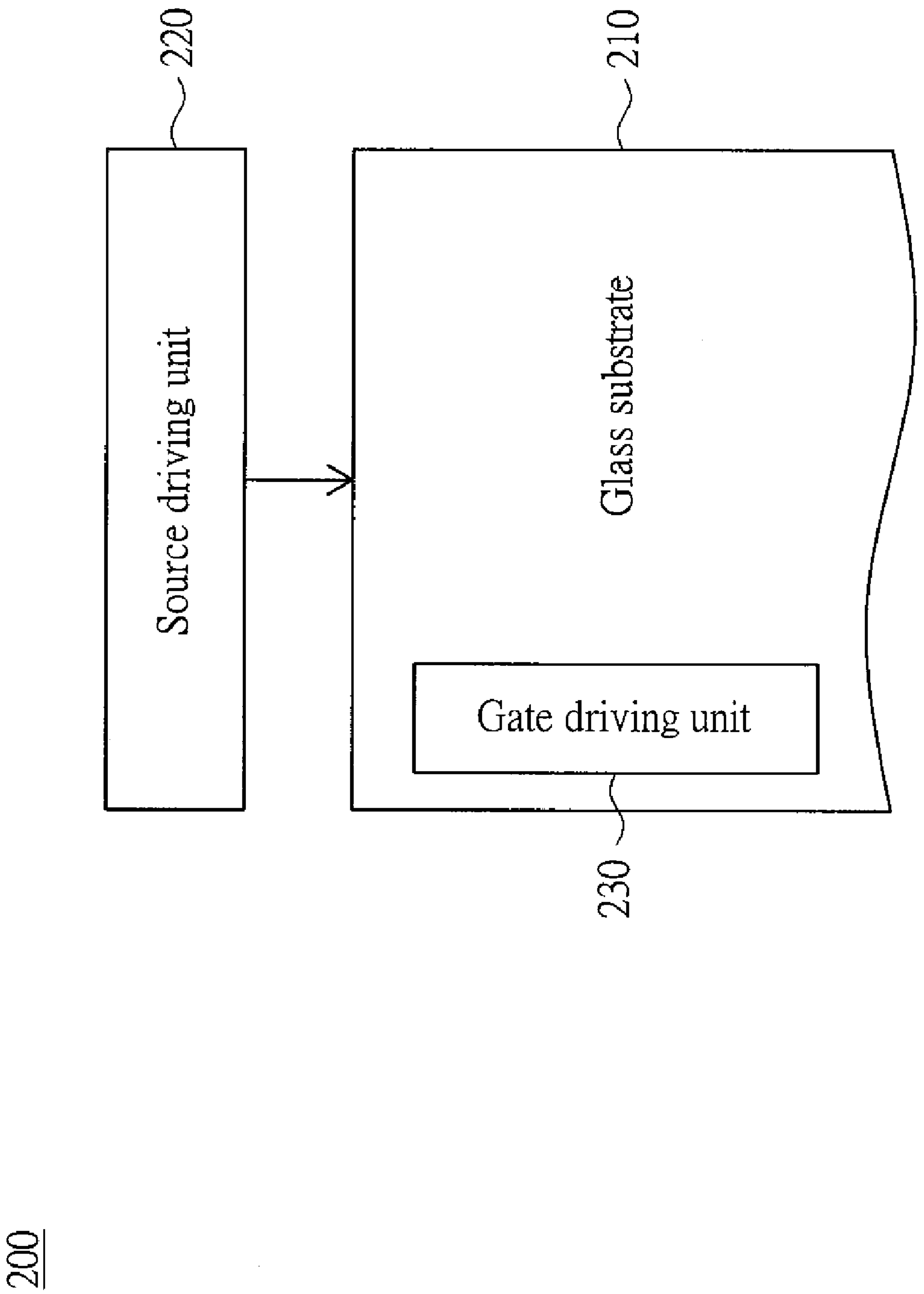
FIG. 2 shows a schematic view of a flat panel display according to an embodiment of the invention.

Referring to FIG. 2, a circuit diagram of a flat panel display 200 according to an embodiment of the invention is shown. The flat panel display 200 includes a glass substrate 210, a source driving unit 220 and a gate driving unit 230. The glass substrate 210 has many pixels (not illustrated). The source driving unit 220 is electrically connected to these pixels. The gate driving unit 230 in this embodiment is disposed on the glass substrate 210 and is electrically connected to the pixels. The gate driving unit 230 has a shift register structure. In an embodiment, the gate driving unit 230 is a-Si gate structure.

Figure 3:
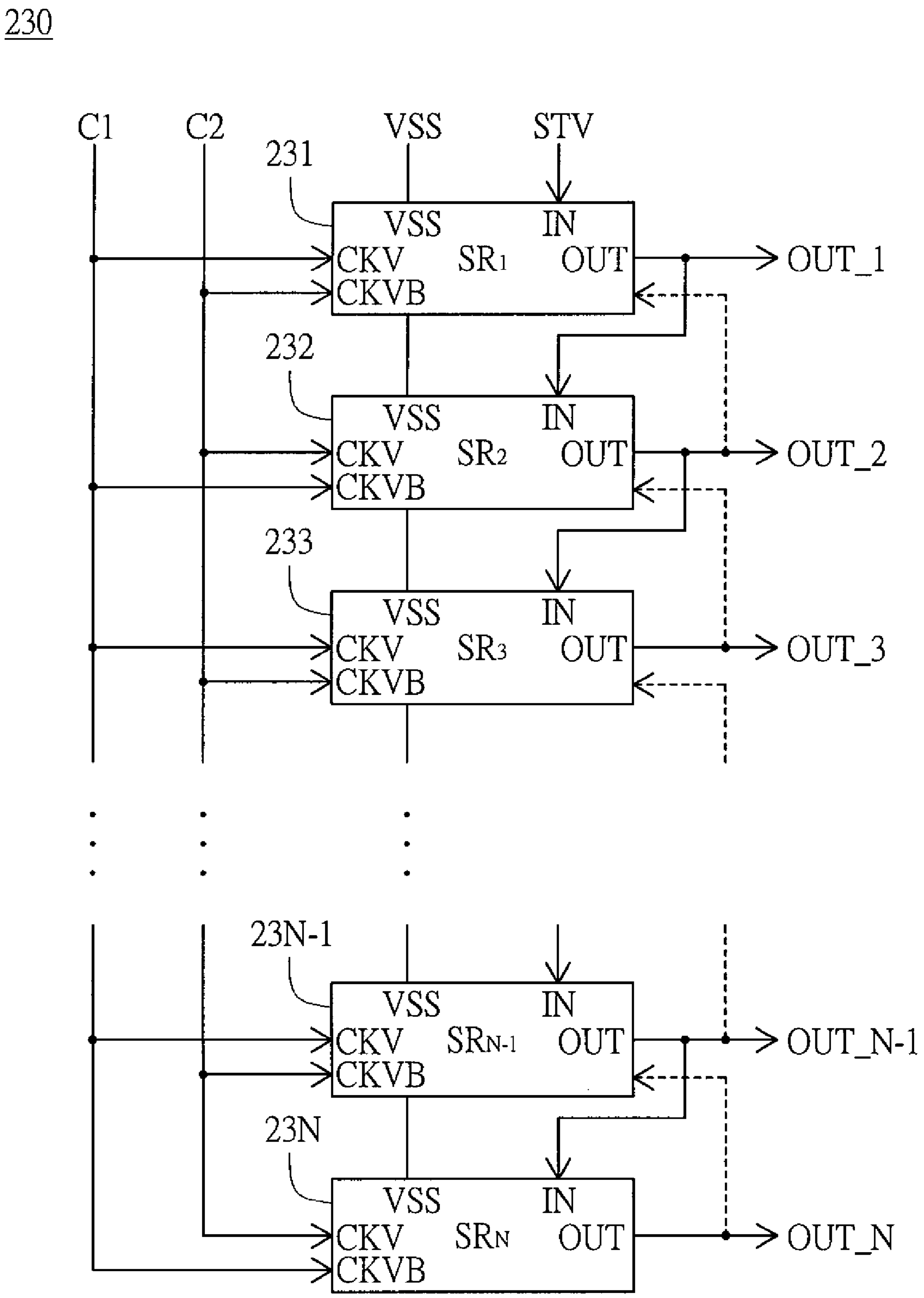
FIG. 3 shows a schematic circuit diagram of a gate driving unit according to an embodiment of the invention.
Figure 4:
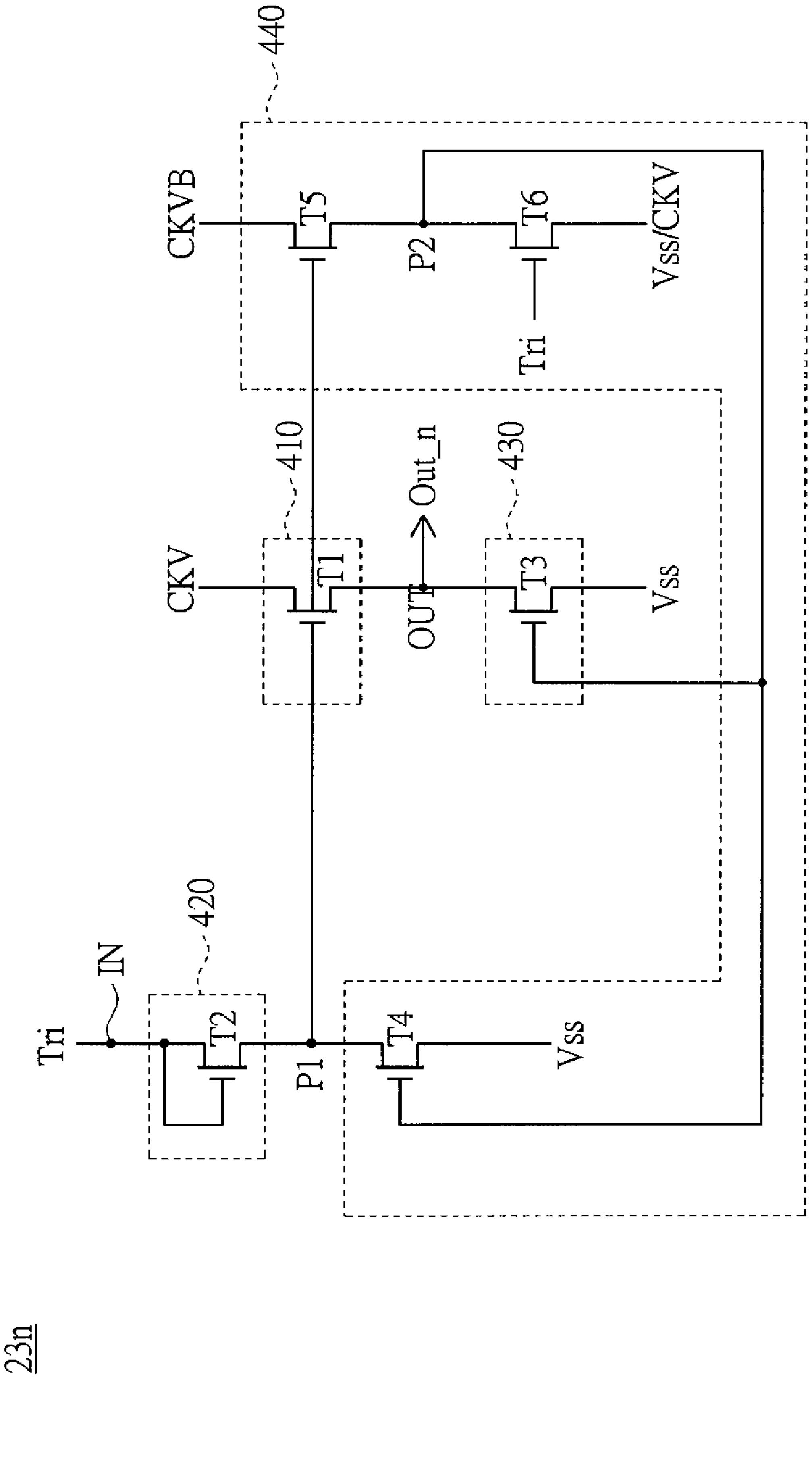
FIG. 4 shows a circuit diagram of a first example of a shift register according to an embodiment of the invention.

The gate driving unit 230 has N shift registers, wherein N is a positive integer Referring to FIG. 3, a circuit diagram of the gate driving unit 230 according to an embodiment of the invention is shown. The gate driving unit 230 has many shift registers 23*n* (n=1~N). Referring to FIG. 4, a circuit diagram of a first example of a shift register 23*n* according to an embodiment of the invention is shown. The shift register 23*n* includes a pull-up unit 410, a driving unit 420, a pull-down unit 430 and a driving control unit 440.

The pull-up unit 410 is coupled to an output terminal OUT. The driving unit 420 is for driving the pull-up unit 410. The pull-down unit 430 is also coupled to the output terminal OUT. The driving control unit 440 provides a DC level voltage and drives the pull-down unit 430. When the driving unit 420 turns on the pull-up unit 410 according to a trigger signal Tri at an IN terminal of the shift register 23*n* and the pull-up unit 410 enables the output terminal OUT to output an $n^{th}$ output signal OUT_n according to a first clock signal C1 or a second clock signal C2 at a CKV terminal of the shift register 23*n*, the driving control unit 440 turns off the pull-down unit 430. When n=1, the trigger signal Tri is a start signal STV, wherein when n is larger than 1, the trigger signal Tri is an $(n-1)^{th}$ output signal OUT_n−1.

After the output terminal outputs the $n^{th}$ output signal Out_n, the driving control unit 440 provides a DC level voltage to drive the pull-down unit 430 according to a second clock signal C2 or the first clock signal at a CKVB terminal of the shift register 23*n*. The pull-down unit 430 then enables the output terminal OUT to output a low level voltage Vss received at a VSS terminal of the shift register 23*n*. The second clock signal C2 is an inverse signal of the first clock signal C1. As can be seen in FIG. 3, when n is an odd number, i.e., for shift registers SR1, SR3 etc., the first clock signal C1 is supplied to the CKV terminal and the second clock signal C2 is supplied to the CKVB terminal of the shift register 23*n*. When n is an even number, i.e., for shift registers SR2, SR4 etc., the first clock signal C1 is supplied to the CKVB terminal and the second clock signal C2 is supplied to the CKV terminal of the shift register 23*n*.

In the shift register 23*n*, the pull-up unit 410 includes a first transistor T1 formed on the glass substrate 210. The first terminal, such as the drain, of the first transistor T1 receives the first clock signal C1 or the second clock signal C2 at the CKV terminal. The second terminal, such as the source, of the first transistor T1 is coupled to the output terminal OUT. The driving unit 420 includes a second transistor T2 formed on the glass substrate 210. The first terminal, such as the drain, of the second transistor T2 receives the trigger signal Tri at the IN terminal and is coupled to the control terminal, such as the gate, of the second transistor T2. The second terminal, such as the source, of the second transistor T2 is coupled to the control terminal, such as the gate, of the first transistor T1.

The pull-down unit 430 includes a third transistor T3 formed on the glass substrate 210. The first terminal, such as the drain, of the third transistor T3 is coupled to the output terminal OUT. The second terminal, such as the source, of the third transistor T3 receives the low level voltage Vss. The driving control unit 440 includes a fourth transistor T4, a fifth transistor T5 and a sixth transistor T6. The fourth transistor T4 is formed on the glass substrate 210. The first terminal, such as the drain, of the fourth transistor T4 is coupled to the second terminal of the second transistor T2. The second terminal, such as the source, of the fourth transistor T4 receives the low level voltage Vss. The control terminal, such as the gate, of the fourth transistor T4 is coupled to the control terminal, such as the gate, of the third transistor T3.

The fifth transistor T5 is formed on the glass substrate 210. The first terminal, such as the drain, of the fifth transistor T5 receives the second clock signal C2 or the first clock signal C1 at the CKVB terminal. The second terminal, such as the source, of the fifth transistor T5 is coupled to the control terminal of the third transistor T3. The control terminal, such as the gate, of the fifth transistor T5 is coupled to the second terminal of the second transistor T2. The sixth transistor T6 is formed on the glass substrate 210. The first terminal, such as the drain, of the sixth transistor T6 is coupled to the second terminal of the fifth transistor T5. The second terminal, such as the source, of the sixth transistor T6 is coupled to either the VSS terminal or the CKV terminal of the shift register 23*n* to receive either the low level voltage Vss or the first clock signal C1. The control terminal, such as the gate, of the sixth transistor T6 receives the trigger signal Tri. The dimension of the sixth transistor T6 in this embodiment is larger than that of the fifth transistor T5, and the dimension ratio T6/T5 is at least 5:1. Other arrangements are, however, not excluded, provided that the difference in configuration between transistors T5 and T6 will result in a predetermined difference in electrical resistance between transistors T5 and T6 when both transistors T5 and T6 are turned on. The turned on transistors T5 and T6 will then define a voltage divider, e.g., of a 5:1 ratio in the instant example, between Vdd at the drain of transistor T5 and Vss at the source of transistor T6 (to make the voltage of P2 sufficiently close to Vss at time t1 to allow the voltage of P2 to turn off transistors T3 and T4 as will be described herein after).

Figure 5:
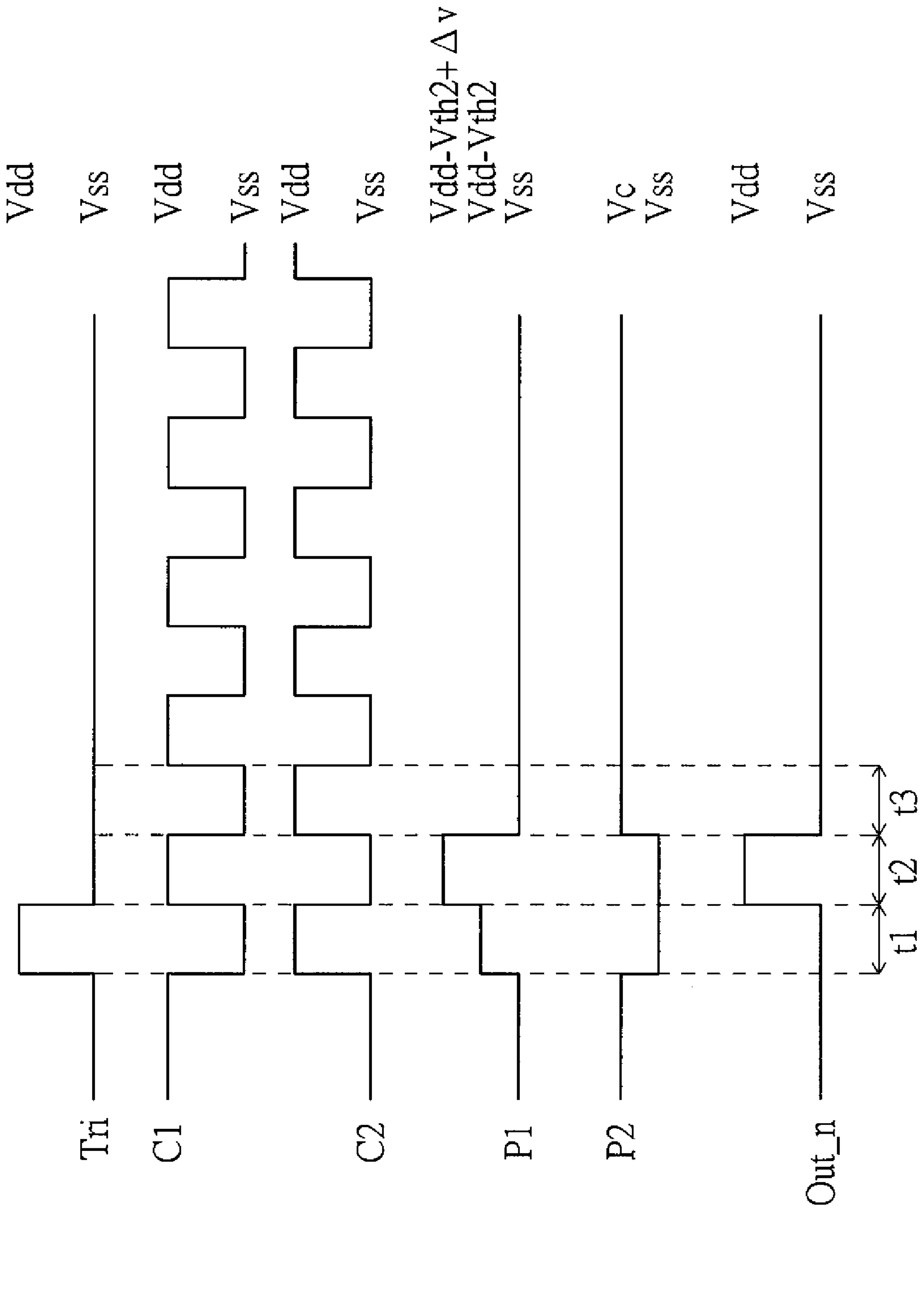
FIG. 5 shows a time diagram of the shift register of FIG. 4 according to an embodiment of the invention.

Referring to FIG. 5, a time diagram of the shift register 23*n* of FIG. 4 when n is an odd number according to an embodiment of the invention is shown. In a first time period t1, the trigger signal Tri is a high level voltage Vdd. The first clock signal C1 at the CKV terminal is the low level voltage Vss. The second clock signal C2 at the CKVB terminal is the high level voltage Vdd. Since the trigger signal Tri is the high level voltage Vdd, the second transistor T2 and the sixth transistor T6 are turned on. The voltage at the node P1 changes toward the high level voltage Vdd from the low level voltage Vss, and becomes the voltage difference between the high level voltage Vdd at the IN terminal and the threshold voltage Vth2 of the second transistor T2. The voltage difference at the node P1 is expressed as: Vdd−Vth2. This voltage difference is sufficient to turn on both the first transistor T1 and the fifth transistor T5, the control terminals of which are both connected to the node P1.

As the configurations (e.g., width/length ratios) of the fifth transistor T5 and the sixth transistor T6 are different, when the fifth transistor T5 and the sixth transistor T6 are both turned on, their electrical resistances are also different, resulting in a voltage divider between Vdd of the second clock signal C2 at the CKVB terminal and Vss present at the second terminal of the sixth transistor T6. The transistors T5 and T6 are configured such that their respective electrical resistances in the voltage divider will cause the voltage at the node P2 to step down to be close to the low level voltage Vss, so that the third transistor T3 and the fourth transistor T4 are turned off, and the output terminal OUT outputs first clock signal C1 at the CKV terminal as the $n^{th}$ output signal Out_n. Meanwhile, the first clock signal C1 is the low level voltage Vss. That is, in the first time period t1, the $n^{th}$ output signal Out_n is the low level voltage Vss.

In a second time period t2, the trigger signal Tri is the low level voltage Vss, the first clock signal C1 is the high level voltage Vdd, and the second clock signal C2 is the low level voltage Vss. The second time period t2 immediately follows the first time period t1. Since the trigger signal Tri is the low level voltage Vss, the second transistor T2 and the sixth transistor T6 are turned off, and consequently, the voltage at the node P1 is affected by its own parasitic capacitor ($C_{p1}$) and the source/gate parasitic capacitor ($C_{gs}$) of the second transistor T2, and is boosted to (Vdd−Vth2+Δv) due to boot-strapping effect, wherein $$\Delta v = \frac{Cgs}{Cgs + Cp1}(Vdd - Vss).$$

Since the voltage at the node P1, i.e., the gate voltages of the first transistor T1 and the fifth transistor T5, exceeds the source voltages at the first transistor T1 and the fifth transistor T5, the first transistor T1 and the fifth transistor T5 remain turned on. Since the second clock signal C2 at the CKVB terminal is now the low level voltage Vss, the voltage at the node P2 remains at the low level voltage Vss, and consequently, the third transistor T3 and the fourth transistor T4 remain turned off. Thus, the first clock signal C1 at the CKV terminal is outputted to the output terminal OUT as the $n^{th}$ output signal Out_n. Meanwhile, the first clock signal C1 is the high level voltage Vdd. That is, in the second time period t2, the $n^{th}$ output signal Out_n is the high level voltage Vdd.

In a third time period t3, the trigger signal Tri is the low level voltage Vss, the first clock signal C1 is the low level voltage Vss, and the second clock signal C2 is the high level voltage Vdd. The third time period t3 immediately follows the second time period t2. Since the trigger signal Tri is the low level voltage Vss, the second transistor T2 and the sixth transistor T6 remain turned off.

Since the second clock signal C2 at the CKVB terminal now changes to the high level voltage Vdd from the low level voltage Vss, the voltage at the node P2 is boosted. When the voltage at the node P2 is boosted to a level that the voltage difference between the source and the gate of the fifth transistor T5 is smaller than a threshold voltage, the fifth transistor T5 is turned off. Meanwhile, the voltage at the node P2 remains at a DC level voltage Vc which, in this particular embodiment, approximately ranges between ⅔ of the positive gate voltage and ⅔ of the negative gate voltage of the third and/or fourth transistors T3, T4.

Since the fifth transistor T5 and the sixth transistor T6 are both turned off, the voltage at the node P2 is not affected by other voltages and remains at the DC level voltage Vc until the next time when the trigger signal Tri changes to the high level voltage Vdd from the low level voltage Vss. The DC level voltage Vc enables the third transistor T3 and the fourth transistor T4 to be turned on. Since the fourth transistor T4 is turned on, the voltage at the node P1 changes to the low level voltage Vss, and consequently, the first transistor T1 is turned off. Also, as the third transistor T3 is turned on, the output terminal OUT outputs the low level voltage Vss as the $n^{th}$ output signal Out_n. That is, in the third time period t3, the $n^{th}$ output signal Out_n is the low level voltage Vss. The operation of the shift register 23*n* of FIG. 4 when n is an even number is similar and will not be described in detail herein.

In the shift register 23*n* described above, the DC level voltage Vc is provided by the driving control unit 440. Thus, the gate bias voltages of the third transistor T3 and the fourth transistor T4 within the shift register 23*n* is decreased without using an additional DC power source or complicated surrounding circuits, hence reducing both the bezel width and cost. Besides, since the gate bias voltages of the third transistor T3 and the fourth transistor T4 will not be boosted too high, the rate at which the threshold voltages of the third transistor T3 and the fourth transistor T4 may increase with time will be reduced. As a result, the service life of the third transistor T3 and the fourth transistor T4 is prolonged and the market competitiveness of the product is enhanced.

Figure 6:
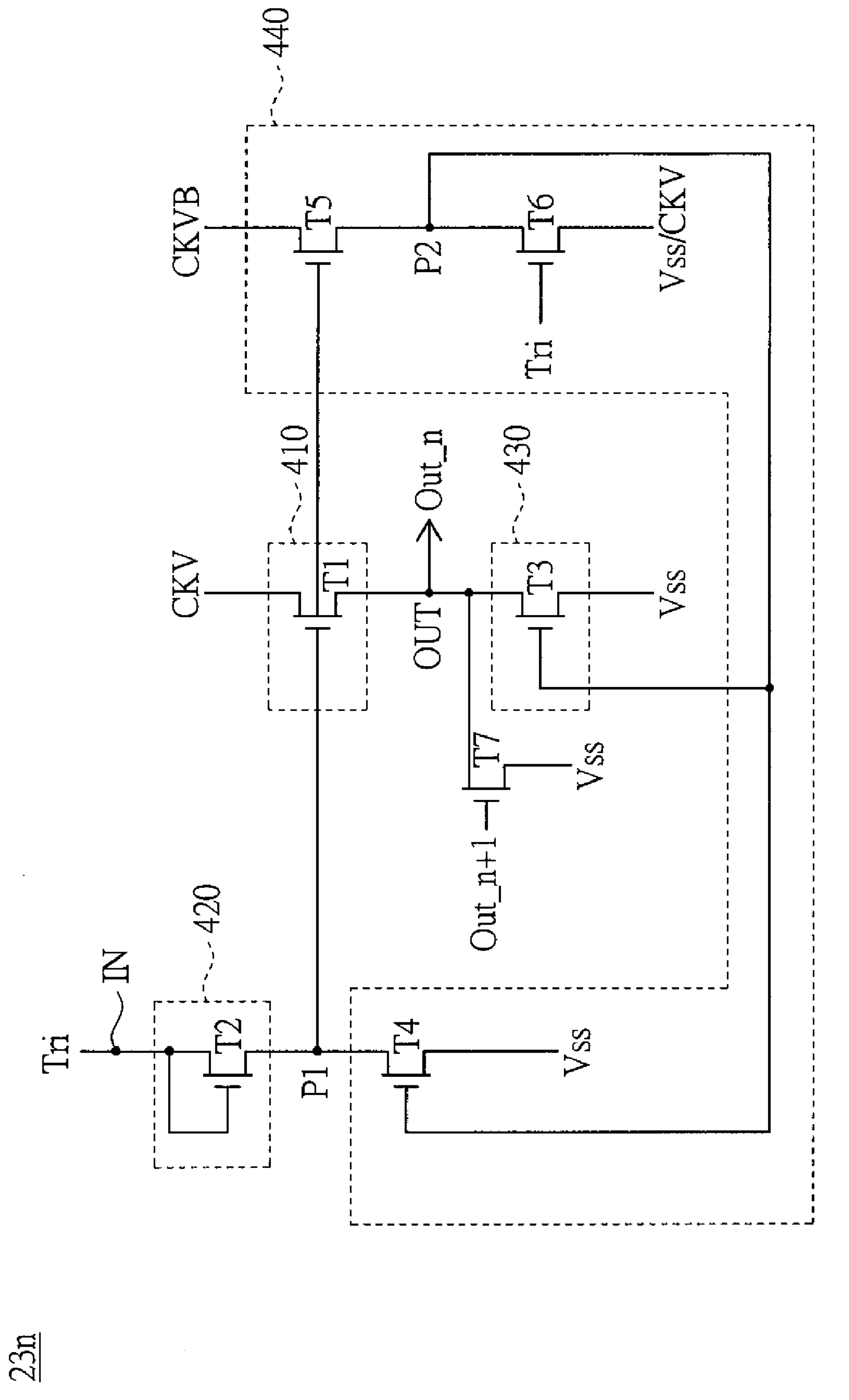
FIG. 6 shows a circuit diagram of a second example of a shift register according to an embodiment of the invention.

Referring to FIG. 6, a circuit diagram of a second example of a shift register 23*n* according to an embodiment of the invention is shown. The shift register 23*n* includes the pull-up unit 410, the driving unit 420, the pull-down unit 430, the driving control unit 440 and a seventh transistor T7. The seventh transistor T7 is formed on the glass substrate 210. The first terminal, such as the drain, of the seventh transistor T7 is coupled to the output terminal OUT The second terminal, such as the source, of the seventh transistor T7 receives the low level voltage Vss. The control terminal, such as the gate, of the seventh transistor T7 receives an $(n+1)^{th}$ output signal Out_n+1 from the shift register 23(*n*+1) as shown by phantom arrows in FIG. 3. The control terminal of the transistor T7 of the last shift register SRn receives an external signal. The seventh transistor T7 substantially keeps the output terminal OUT at the low level voltage Vss when the $(n+1)^{th}$ output signal Out_n+1 is at the high level voltage Vdd, so as to prevent noise interference, to assure the normal operation of the circuit and to avoid errors.

Figure 7:
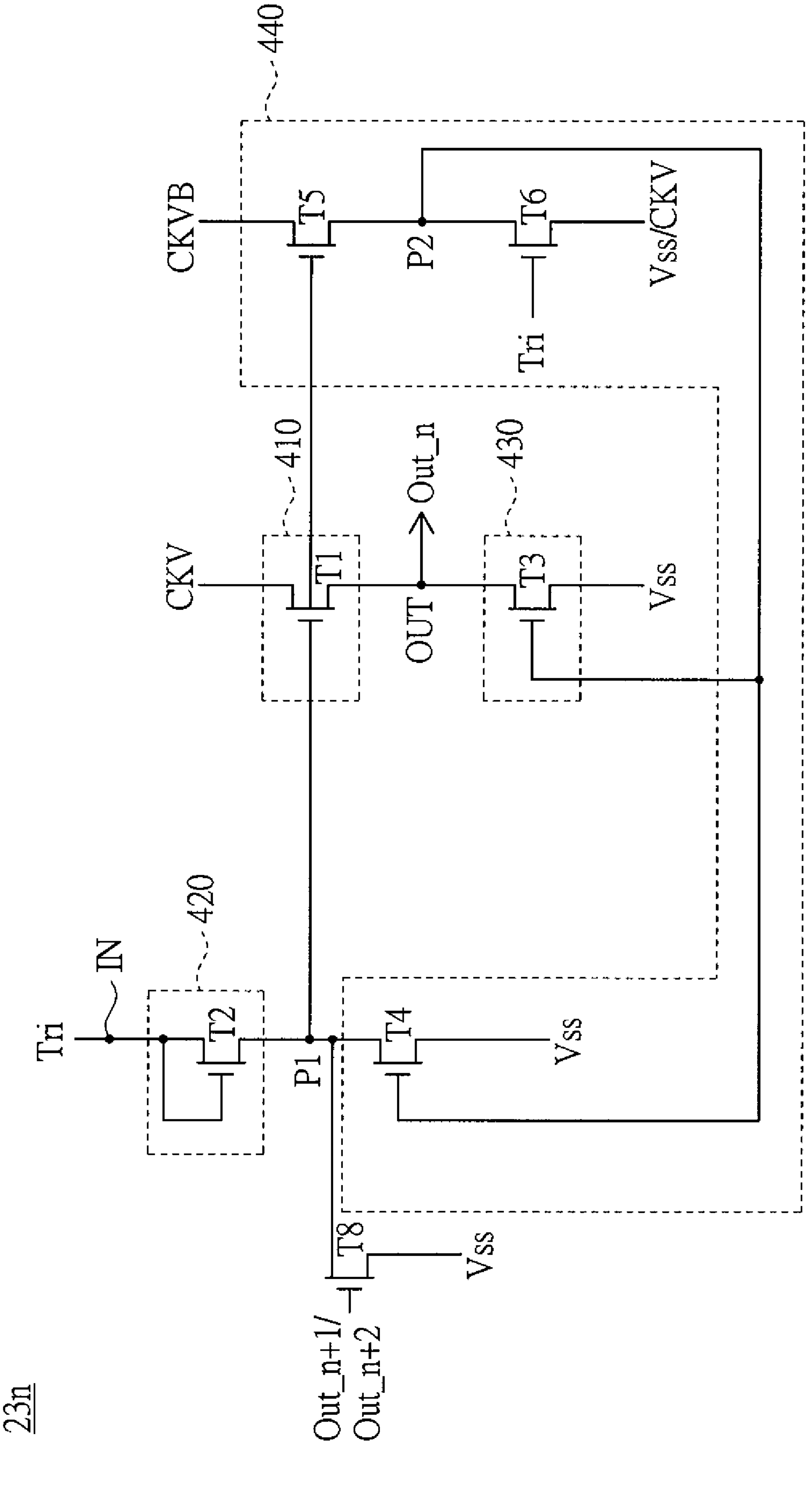
FIG. 7 shows a circuit diagram of a third example of a shift register according to an embodiment of the invention.

Referring to FIG. 7, a circuit diagram of a third example of a shift register 23*n* according to an embodiment of the invention is shown. The shift register 23*n* includes the pull-up unit 410, the driving unit 420, the pull-down unit 430, the driving control unit 440 and an eighth transistor T8. The eighth transistor T8 is formed on the glass substrate 210. The first terminal, such as the drain, of the eighth transistor T8 is coupled to the second terminal of the second transistor T2. The second terminal, such as the source, of the eighth transistor T8 receives the low level voltage Vss. The control terminal, such as the gate, of the eighth transistor T8 receives either the $(n+1)^{th}$ output signal Out_n+1 or an $(n+2)^{th}$ output signal Out_n+2. The eighth transistor T8 substantially keeps the output terminal OUT at the low level voltage Vss when the $(n+1)^{th}$ output signal Out_n+1 or the $(n+2)^{th}$ output signal Out_n+2 is at the high level voltage Vdd, so as to prevent noise interference, to assure the normal operation of the circuit and to avoid errors.

Figure 8:
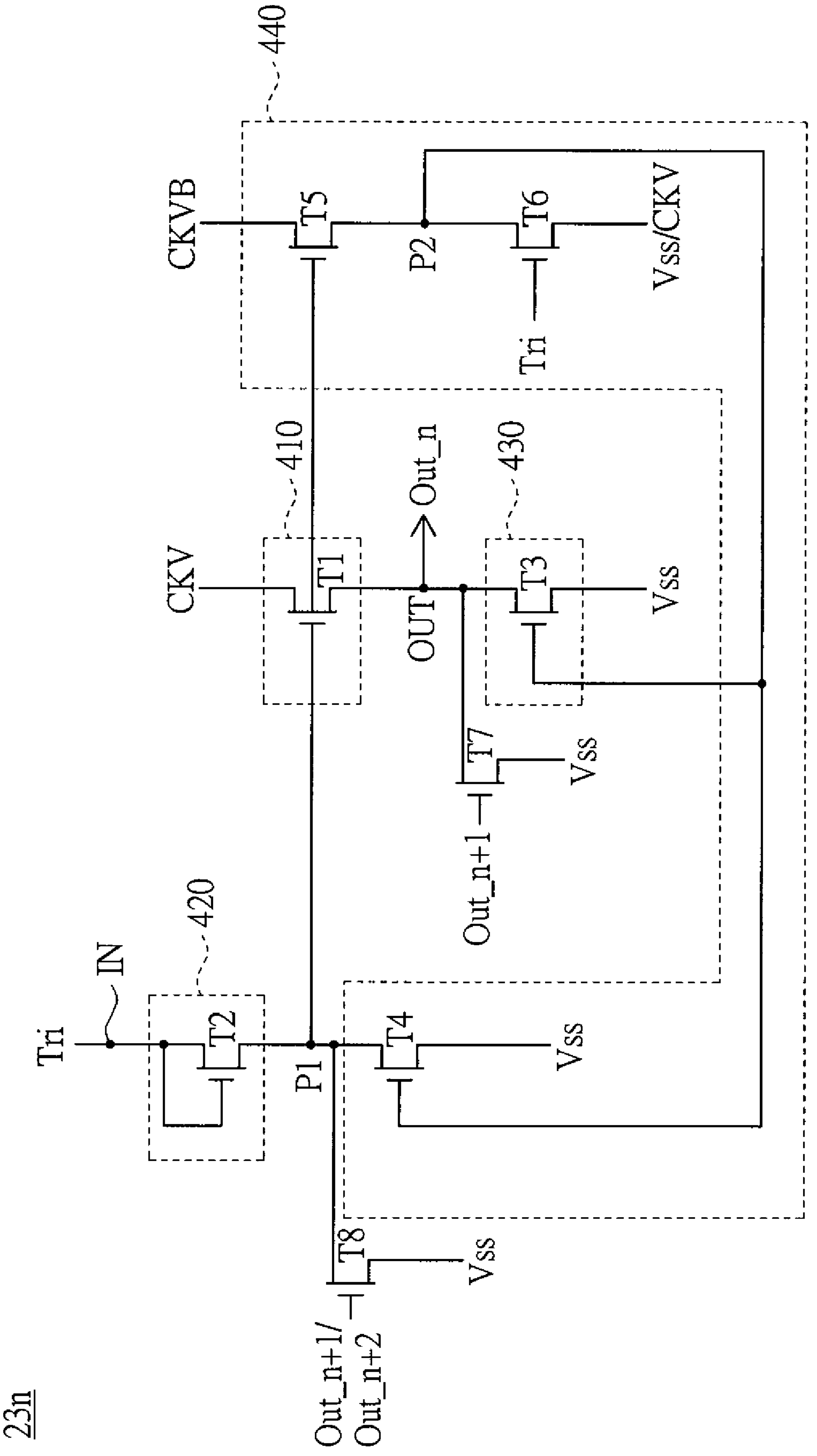
FIG. 8 shows a circuit diagram of a fourth example of a shift register according to an embodiment of the invention.

Referring to FIG. 8, a circuit diagram of a fourth example of a shift register 23*n* according to an embodiment of the invention is shown. The shift register 23*n* includes the pull-up unit 410, the driving unit 420, the pull-down unit 430, the driving control unit 440, the seventh transistor T7 and the eighth transistor T8. The seventh transistor T7 is formed on the glass substrate 210. The first terminal of the seventh transistor T7 is coupled to the output terminal OUT. The second terminal of the seventh transistor T7 receives the low level voltage Vss. The control terminal of the seventh transistor T7 receives the $(n+1)^{th}$ output signal Out_n+1.

The eighth transistor T8 is formed on the glass substrate 210. The first terminal of the eighth transistor T8 is coupled the second terminal of the second transistor T2. The second terminal of the eighth transistor T8 receives the low level voltage Vss. The control terminal of the eighth transistor T8 receives either the $(n+1)^{th}$ output signal Out_n+1 or the $(n+2)^{th}$ output signal Out_n+2. The seventh transistor T7 and the eighth transistor T8 substantially keep the output terminal OUT at the low level voltage Vss when the $(n+1)^{th}$ output signal Out_n+1 and/or the $(n+2)^{th}$ output signal Out_n+2 is/are at the high level voltage Vdd, so as to prevent noise interference, to assure the normal operation of the circuit and to avoid errors.

An embodiment of the invention also discloses a method for driving a flat panel display, such as the flat panel display 200.

Figure 9:
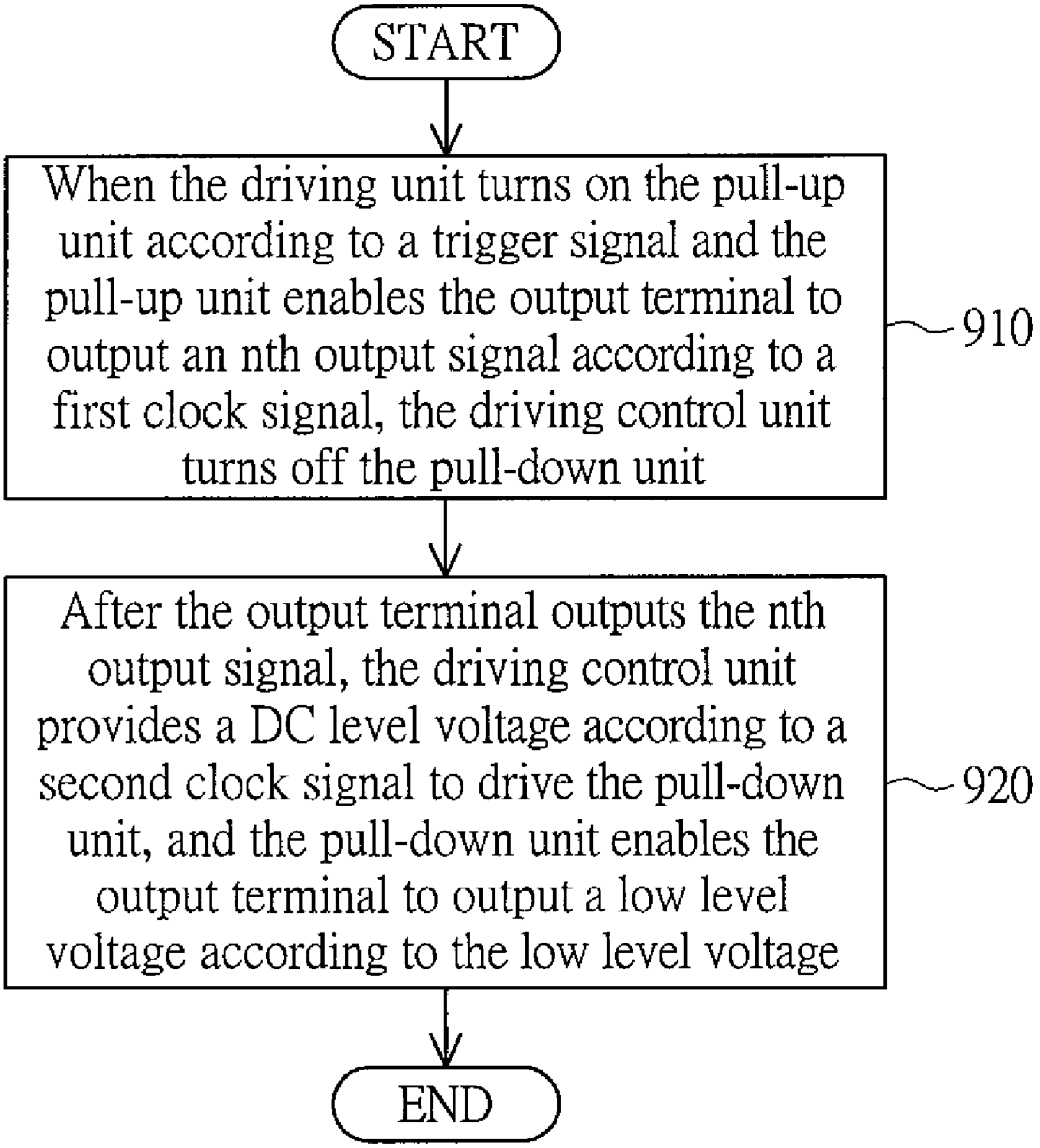
FIG. 9 shows a flowchart of a method for driving a flat panel display according to an embodiment of the invention.

Referring to FIG. 9, a flowchart of a method for driving a flat panel display according to an embodiment of the invention is shown. First, the method begins at step 910, when the driving unit, e.g., 420, turns on the pull-up unit, e.g., 410, according to a trigger signal and the pull-up unit enables the output terminal to output an $n^{th}$ output signal according to a first clock signal, the driving control unit, e.g., 440, turns off the pull-down unit, e.g., 430. The trigger signal is an $(n-1)^{th}$ output signal or a start signal.

Then, the method proceeds to step 920. After the output terminal outputs the $n^{th}$ output signal, the driving control unit provides a DC level voltage according to a second clock signal to drive the pull-down unit, and the pull-down unit enables the output terminal to output a low level voltage according to the low level voltage. The second clock signal is an inverse signal of the first clock signal. The operational principles of the method for driving a flat panel display have been already disclosed in the above description of various embodiments of the shift register 23*n*, and will not be repeated herein.

According to the flat panel display and driving method thereof, as disclosed in the above exemplary embodiments of the invention, a DC level voltage is generated by an internal simple circuit, so that the gate bias voltage of at least one transistor inside the shift register can be limited without using an additional surrounding circuit or an external DC power source, hence reducing the circuit complexity and bezel width. Besides, the DC level voltage in some embodiments ranges between ⅔ of the positive gate voltage and ⅔ of the negative gate voltage, so that the gate bias voltage of the at least one transistor will not go too high, and the rate at which the threshold voltage of the at least one transistor may increase with time will be reduced. As a result, the service life of the at least one transistor is prolonged and the market competitiveness of the product is enhanced.

While the disclosure has been given by way of examples and in terms of embodiments, it is to be understood that the invention is not limited thereto. On the contrary, it is intended to cover various modifications and similar arrangements and procedures, and the scope of the appended claims, therefore, should be accorded the broadest interpretation so as to encompass all such modifications and similar arrangements and procedures.

What is claimed is:

1. A flat panel display, comprising:

a glass substrate having a plurality of pixels;

a source driving unit electrically connected to the pixels; and a gate driving unit having N shift registers, wherein N is a positive integer, n is a positive integer from 1 to N, and the $n^{th}$ shift register comprises:

a pull-up unit coupled to an output terminal for outputting at the output terminal, when the pull-up unit is turned on, a first portion of an $n^{th}$ output signal according to one of a first clock signal and a second clock signal;

a driving unit comprising a first switch device having a first terminal for receiving a trigger signal and a second terminal for outputting a driving voltage to drive the pull-up unit according to the trigger signal;

a pull-down unit coupled to the output terminal for outputting at the output terminal, when the pull-down unit is turned on, a second portion of the $n^{th}$ output signal, the second portion being subsequent to the first portion; and a driving control unit comprising a second switch device having a first terminal for receiving the other of the first clock signal and the second clock signal, and a control terminal controllable by the driving voltage output from the second terminal of the first switch device, for providing a DC level voltage to drive the pull-down unit according to the other of the first clock signal and the second clock signal, wherein the trigger signal is an $(n-1)^{th}$ output signal for $n \neq 1$, and a start signal for $n=1$, and the DC level voltage is between a high level voltage of the first portion and a low level voltage of the second portion of the $n^{th}$ output signal.

2. The flat panel display according to claim 1, wherein the second clock signal is an inverse signal of the first clock signal.

3. The flat panel display according to claim 1, wherein the pull-up unit comprises:

a first transistor formed on the glass substrate, wherein a first terminal of the first transistor is coupled to receive the one of the first clock signal and the second clock signal, and a second terminal of the first transistor is coupled to the output terminal.

4. The flat panel display according to claim 3, wherein the driving unit comprises:

a second transistor formed on the glass substrate, wherein a first terminal of the second transistor is coupled to receive the trigger signal and is coupled to a control terminal of the second transistor, and a second terminal of the second transistor is coupled to a control terminal of the first transistor, the second transistor constituting the first switch device.

5. The flat panel display according to claim 4, wherein the pull-down unit comprises:

a third transistor formed on the glass substrate, wherein a first terminal of the third transistor is coupled to the output terminal, and a second terminal of the third transistor is coupled to receive the low level voltage.

6. The flat panel display according to claim 5, wherein the driving control unit comprises:

a fourth transistor formed on the glass substrate, wherein a first terminal of the fourth transistor is coupled to the second terminal of the second transistor, a second terminal of the fourth transistor is coupled to receive the low level voltage, and a control terminal of the fourth transistor is coupled to a control terminal of the third transistor;

a fifth transistor formed on the glass substrate, wherein a first terminal of the fifth transistor is coupled to receive the other of the first clock signal and the second clock signal, a second terminal of the fifth transistor is coupled to the control terminal of the third transistor, and a control terminal of the fifth transistor is coupled to the second terminal of the second transistor, the fifth transistor constituting the second switch device; and a sixth transistor formed on the glass substrate, wherein a first terminal of the sixth transistor is coupled to the second terminal of the fifth transistor, a second terminal of the sixth transistor is coupled to receive the low level voltage or the one of the first clock signal and the second clock signal, and a control terminal of the sixth transistor is coupled to receive the trigger signal.

7. The flat panel display according to claim 6, wherein at least one element characteristic of the fifth transistor is different from that of the sixth transistor.

8. The flat panel display according to claim 7, wherein in a first time period, the trigger signal is the high level voltage, the one of the first clock signal and the second clock signal is the low level voltage, the other of the first clock signal and the second clock signal is the high level voltage, and the second transistor and the sixth transistor are turned on, so that the first transistor and the fifth transistor are turned on, the third transistor and the fourth transistor are turned off, and the output terminal outputs the low level voltage as the $n^{th}$ output signal.

9. The flat panel display according to claim 8, wherein in a second time period immediately following the first time period, the trigger signal is the low level voltage, the one of the first clock signal and the second clock signal is the high level voltage, the other of the first clock signal and the second clock signal is the low level voltage, the second transistor and the sixth transistor are turned off, the first transistor and the fifth transistor are turned on, the voltage level at the second terminal of the fifth transistor enables the third transistor and the fourth transistor to be turned off, and the output terminal outputs the high level voltage as the $n^{th}$ output signal.

10. The flat panel display according to claim 9, wherein in a third time period immediately following the second time period, the trigger signal is the low level voltage, the one of the first clock signal and the second clock signal is the low level voltage, the other of the first clock signal and the second clock signal is the high level voltage, the second transistor and the sixth transistor are turned off, the fifth transistor is turned off, the second terminal of the fifth transistor provides the DC level voltage so that the third transistor and the fourth transistor are turned on, the first transistor is turned off, and the output terminal outputs the low level voltage as the $n^{th}$ output signal.

11. The flat panel display according to claim 6, further comprising at least one of:

a seventh transistor formed on the glass substrate, wherein a first terminal of the seventh transistor is coupled to the output terminal, a second terminal of the seventh transistor is coupled to receive the low level voltage, and a control terminal of the seventh transistor is coupled to receive an $(n+1)^{th}$ output signal; and an eighth transistor formed on the glass substrate, wherein a first terminal of the eighth transistor is coupled to the second terminal of the second transistor, a second terminal of the eighth transistor is coupled to receive the low level voltage, and a control terminal of the eighth transistor is coupled to receive the $(n+1)^{th}$ output signal or an $(n+2)^{th}$ output signal.

12. The flat panel display according to claim 1, wherein the gate driving unit has an a-Si gate structure.

13. The flat panel display according to claim 1, wherein when n is an odd number, the driving unit of the $n^{th}$ shift register is coupled to receive the first clock signal, and the driving control unit of the $n^{th}$ shift register is coupled to receive the second clock signal; and when n is an even number, the driving unit of the $n^{th}$ shift register is coupled to receive the second clock signal, and the driving control unit of the $n^{th}$ shift register is coupled to receive the first clock signal.

14. A method of driving a flat panel display comprising a glass substrate, a source driving unit and a gate driving unit, wherein the glass substrate comprises a plurality of pixels to which the source driving unit is electrically connected, the gate driving unit comprises N shift registers, N is a positive integer, n is a positive integer from 1 to N, and the $n^{th}$ shift register comprises a pull-up unit, a driving unit, a pull-down unit and a driving control unit, the pull-up unit is coupled to an output terminal, the driving unit is coupled to drive the pull-up unit, the pull-down unit is coupled to the output terminal, and the driving control unit is configured to provide a DC level voltage and to drive the pull-down unit, the method comprising:

when the driving unit outputs a driving voltage to turn on the pull-up unit according to a trigger signal, the pull-up unit enabling the output terminal to output an $n^{th}$ output signal according to one of a first clock signal and a second clock signal, the driving control unit turning off the pull-down unit, wherein the trigger signal is an $(n-1)^{th}$ output signal for $n \neq 1$, and a start signal for $n=1$; and afterwards, the driving control unit providing the DC level voltage to drive the pull-down unit according to the other of the first clock signal and the second clock signal, and the pull-down unit enabling the output terminal to output a low level voltage, wherein the driving unit comprises a first switch device having a first terminal for receiving the trigger signal and a second terminal for outputting the driving voltage, the driving control unit comprises a second switch device having a first terminal for receiving the other of the first clock signal and the second clock signal and a control terminal controlled by the driving voltage output from the second terminal of the first switch device for providing the DC level voltage to drive the pull-down unit according to the other of the first clock signal and the second clock signal, and the DC level voltage is between a high level voltage of the $n^{th}$ output signal and the low level voltage.

15. The method according to claim 14, wherein the second clock signal is an inverse signal of the first clock signal.

16. The method according to claim 14, wherein the pull-up unit comprises a first transistor formed on the glass substrate, a first terminal of the first transistor receives the one of the first clock signal and the second clock signal, a second terminal of the first transistor is coupled to the output terminal, the driving unit comprises a second transistor formed on the glass substrate, a first terminal of the second transistor receives the trigger signal and is coupled to a control terminal of the second transistor, a second terminal of the second transistor is coupled to a control terminal of the first transistor, the second transistor constituting the first switch device, the pull-down unit comprises a third transistor formed on the glass substrate, a first terminal of the third transistor is coupled to the output terminal, a second terminal of the third transistor receives the low level voltage, the driving control unit comprises a fourth transistor, a fifth transistor and a sixth transistor, the fifth transistor constituting the second switch device, the fourth transistor is formed on the glass substrate, a first terminal of the fourth transistor is coupled to the second terminal of the second transistor, a second terminal of the fourth transistor receives the low level voltage, a control terminal of the fourth transistor is coupled to a control terminal of the third transistor, the fifth transistor is formed on the glass substrate, a first terminal of the fifth transistor receives the other of the first clock signal and the second clock signal, a second terminal of the fifth transistor is coupled to the control terminal of the third transistor, a control terminal of the fifth transistor is coupled to the second terminal of the second transistor, the sixth transistor is formed on the glass substrate, a first terminal of the sixth transistor is coupled to the second terminal of the fifth transistor, a second terminal of the sixth transistor receives the low level voltage or the one of the first clock signal and the second clock signal, a control terminal of the sixth transistor receives the trigger signal.

17. The method according to claim 16, wherein at least one element characteristic of the fifth transistor is different from that of the sixth transistor.

18. The method according to claim 17, further comprising:

in a first time period, the trigger signal changes to the high level voltage, the one of the first clock signal and the second clock signal changes to the low level voltage, the other of the first clock signal and the second clock signal changes to the high level voltage, the second transistor and the sixth transistor are turned on, so that the first transistor and the fifth transistor are turned on, the third transistor and the fourth transistor are turned off, and the output terminal outputs the low level voltage as the $n^{th}$ output signal.

19. The method according to claim 18, further comprising:

in a second time period immediately following the first time period, the trigger signal changes to the low level voltage, the one of the first clock signal and the second clock signal changes to the high level voltage, the other of the first clock signal and the second clock signal changes to the low level voltage, the second transistor and the sixth transistor are turned off, the first transistor and the fifth transistor are turned on, the voltage level of the second terminal of the fifth transistor enables the third transistor and the fourth transistor to be turned off, and the output terminal outputs the high level voltage as the $n^{th}$ output signal.

20. The method according to claim 19, further comprising:

in a third time period immediately following the second time period, the trigger signal remains at the low level voltage, the one of the first clock signal and the second clock signal changes to the low level voltage, the other of the first clock signal and the second clock signal changes to the high level voltage, the second transistor and the sixth transistor are turned off, the fifth transistor is turned off, the second terminal of the fifth transistor provides the DC level voltage so that the third transistor and the fourth transistor are turned on, the first transistor is turned off, and the output terminal outputs the low level voltage as the $n^{th}$ output signal.

21. The method according to claim 16, further comprising:

providing the low level voltage to the output terminal according to an $(n+1)^{th}$ output signal.

22. The method according to claim 16, further comprising:

turning off the first transistor for enabling the output terminal to output the low level voltage according to an $(n+1)^{th}$ output signal or an $(n+2)^{th}$ output signal.

* * * * *